Nov. 23, 1954     Q. BERG     2,694,808
APPLICATOR FOR ELECTRICAL CONNECTORS AND THE LIKE
Original Filed March 31, 1951     7 Sheets-Sheet 1

INVENTOR
Quentin Berg
BY
ATTORNEYS

Nov. 23, 1954  Q. BERG  2,694,808
APPLICATOR FOR ELECTRICAL CONNECTORS AND THE LIKE
Original Filed March 31, 1951  7 Sheets-Sheet 2

INVENTOR
Quentin Berg
BY
ATTORNEYS

Nov. 23, 1954

Q. BERG 2,694,808

APPLICATOR FOR ELECTRICAL CONNECTORS AND THE LIKE

Original Filed March 31, 1951

INVENTOR
Quentin Berg
BY
ATTORNEYS

Nov. 23, 1954  Q. BERG  2,694,808
APPLICATOR FOR ELECTRICAL CONNECTORS AND THE LIKE
Original Filed March 31, 1951  7 Sheets-Sheet 6
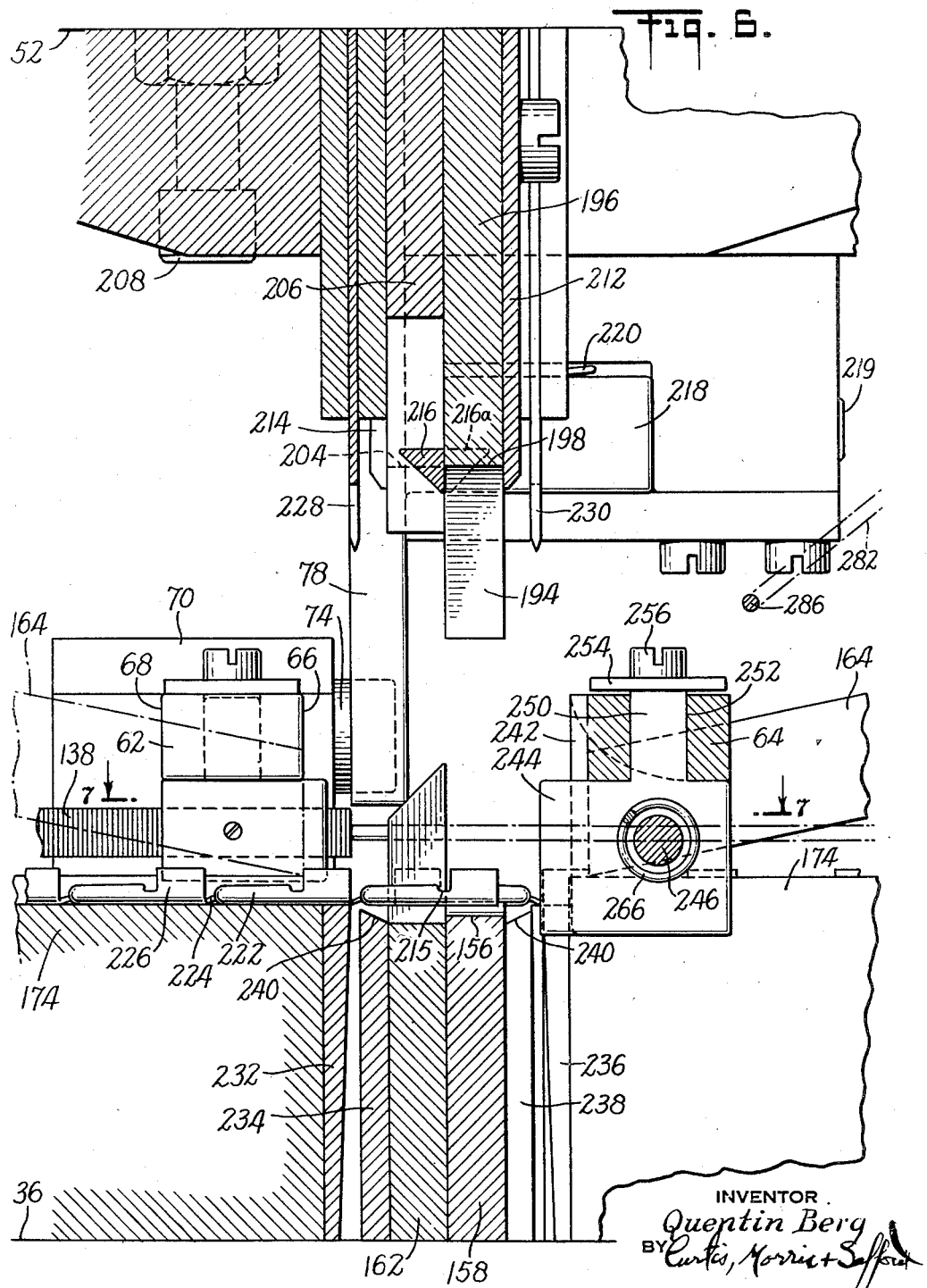
INVENTOR.
Quentin Berg
BY Curtis, Morris + Safford
ATTORNEYS Nov. 23, 1954     Q. BERG     2,694,808
APPLICATOR FOR ELECTRICAL CONNECTORS AND THE LIKE
Original Filed March 31, 1951     7 Sheets-Sheet 7
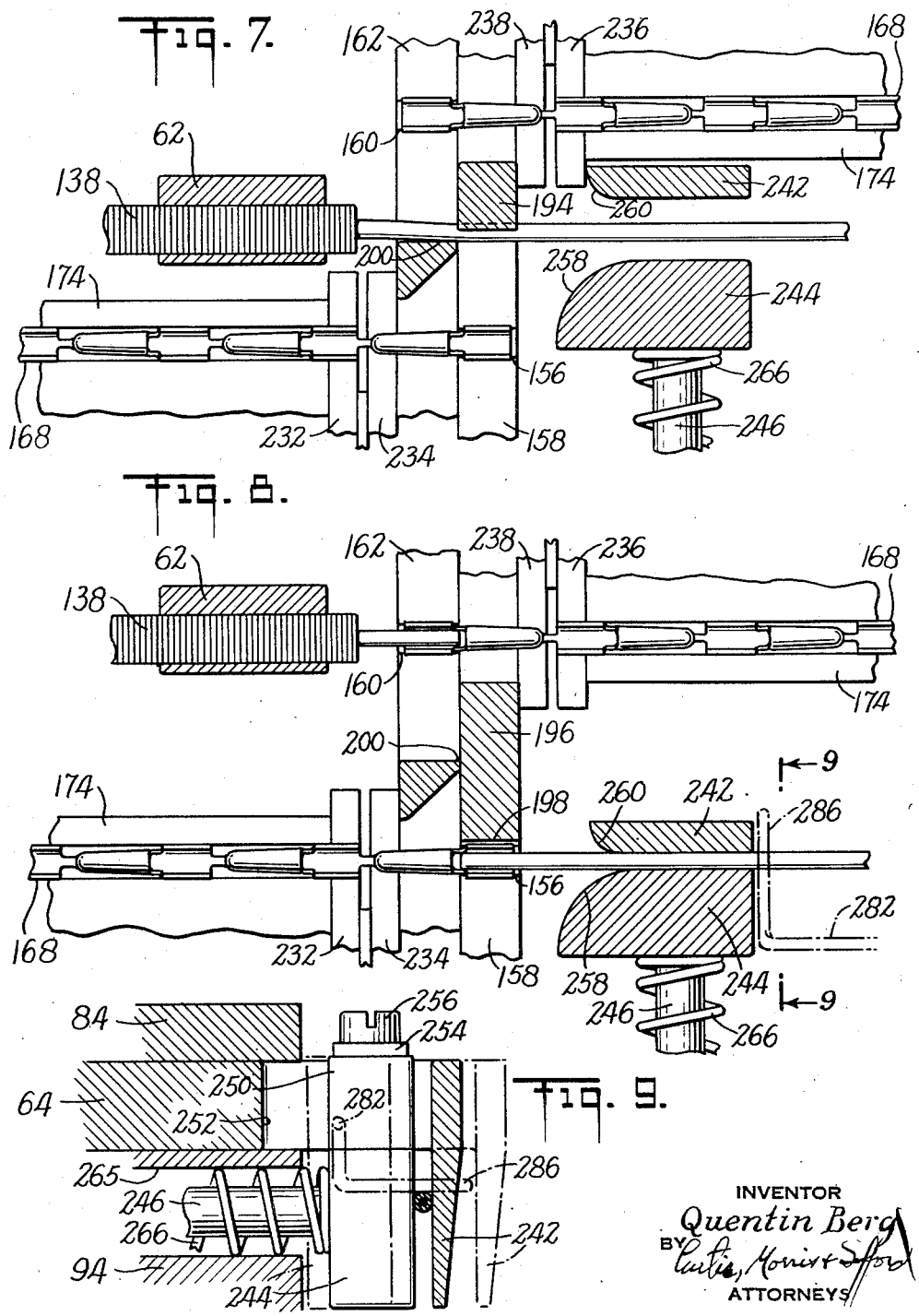

United States Patent Office 2,694,808
Patented Nov. 23, 1954

2,694,808

APPLICATOR FOR ELECTRICAL CONNECTORS AND THE LIKE

Quentin Berg, New Cumberland, Pa., assignor to Aircraft-Marine Products, Inc., Harrisburg, Pa.

Original application March 31, 1951, Serial No. 218,671. Divided and this application February 17, 1954, Serial No. 415,407

4 Claims. (Cl. 1—66)

This invention relates to a process of making electrical leads and to a machine for facilitating the practice of the process. This application is a division of my pending application Serial No. 218,671, filed March 31, 1951.

Electrical leads of the type to the manufacture of which the invention is directed comprise each a length of electrically conductive wire suitable for making a desired electrical connection, this length of wire, usually insulated, having crimped upon each end suitable connecting means, such as a plug or pin or eyelet or other contact-making element, the plug or pin or eyelet or other contact-making element and its ferrule being usually integral and the ferrule being open on one side to receive the wire end to be crimped. In order to avoid the necessity for stripping the insulation to make a conductive connection when, as usual, the lead wire is insulated, the connector ferrule is usually provided with insulation piercing ears, or points struck up from the metal of the ferrule itself.

Heretofore electrical leads of the type above described have been made by cutting conductive wire to the desired lead lengths and then either crimping a connector first on one end of the wire and reversing the wire and crimping a connector on the other end or inserting the length of lead wire in a carrier that presents the two ends to two crimping mechanisms that will crimp the connectors simultaneously on the two ends thereof. With either of the foregoing methods the bringing of the connectors and the lead wire ends into proper relation to each other for the crimping operation is, of course, a prime requisite for successful operation and the speed with which this can be accomplished is a prime factor in the productive capacity of a lead making machine. An object of the present invention is to simplify and facilitate the application of connectors to lead wires by simplifying the operations which bring the connectors and lead wire ends into proper relation to each other for the crimping operations.

With the foregoing and other objects in view the invention herein disclosed comprises, first, an improved process of making electrical leads of the type hereinabove described which consists in crimping a connector upon the leading end of conductor wire drawn from a coil or other source of continuous supply, feeding the wire and attached connector past the point at which the connector was crimped thereon until the fed portion provides the desired lead length, severing said length, holding each wire near the end formed by the severing operation and crimping connectors respectively upon the trailing end of the severed lead wire and upon the new leading end of the wire from said coil or other source of continuous supply and then repeating the feeding, cutting and crimping cycle of operations.

In view of the fact that connectors, other than those that consist merely of ferrules, have parts projecting beyond the wire-embracing ferrules, it is found that in the preferred practice of the process just described the wire ends, after the severing operation, should be separated before the crimping operation and that the simplest method of effecting such separation is to displace them laterally with respect to each other and to provide corresponding laterally displaced crimping means for crimping a connector upon each of the newly formed wire ends. As hereinabove set forth, the two wires formed by the cutting or severing step of the novel process of the present invention are each held near the end formed by the severing operation while connectors are crimped upon the new ends thus formed. Important features of the novel machine for facilitating the practice of the novel process of the invention are, therefore, the construction and arrangement of wire guides and holders and of means for effecting the relative movements of said wire guides and holders and of the respective crimping means, into which the connectors have been fed, to bring about the introduction of the wire ends into the respective connectors preparatory to the crimping operation. A particularly important feature of the invention is the provision for relative movement or lateral displacement of the wire guides and holders between a position in which their guide openings are in wire feeding alignment with each other and a position in which said guides and holders hold the new wire ends formed by the cutting and severing operation over the connector supporting dies of the respective laterally offset crimping mechanisms, followed by a movement of said guides and holders transverse to the plane of the aforementioned lateral displacement to bring the wire ends held thereby into crimping relation to the respective connectors supported on said connector supporting dies.

Another important feature of the novel machine for facilitating the practice of the novel process of the present invention is the provision for discharging the completed lead from the second wire guide through which the lead wire is fed before a new length of lead wire is fed into this guide.

Other objects, important features and advantages of the invention, to which reference has not hereinabove specifically been made, will appear hereinafter when the following description and claims are considered in connection with the accompanying drawings, in which—

Figure 6 is a section on the line 6—6 of each of Figs. 3, 4 and 5, looking in the direction indicated by the arrows shown in each of these figures;

Figure 7 is a section on the line 7—7 of Fig. 6 looking in the direction indicated by the arrows;

Figure 8 is a view similar to Fig. 7 at a later stage in the operation of the machine, and Figure 9 is a section on the line 9—9 of Fig. 8, this view showing in dotted lines the start of the return movement of the second wire guide slide after the crimping operation and the holding of one jaw of the guide by the solenoid to cause discharge of the completed lead.

Figure 1:
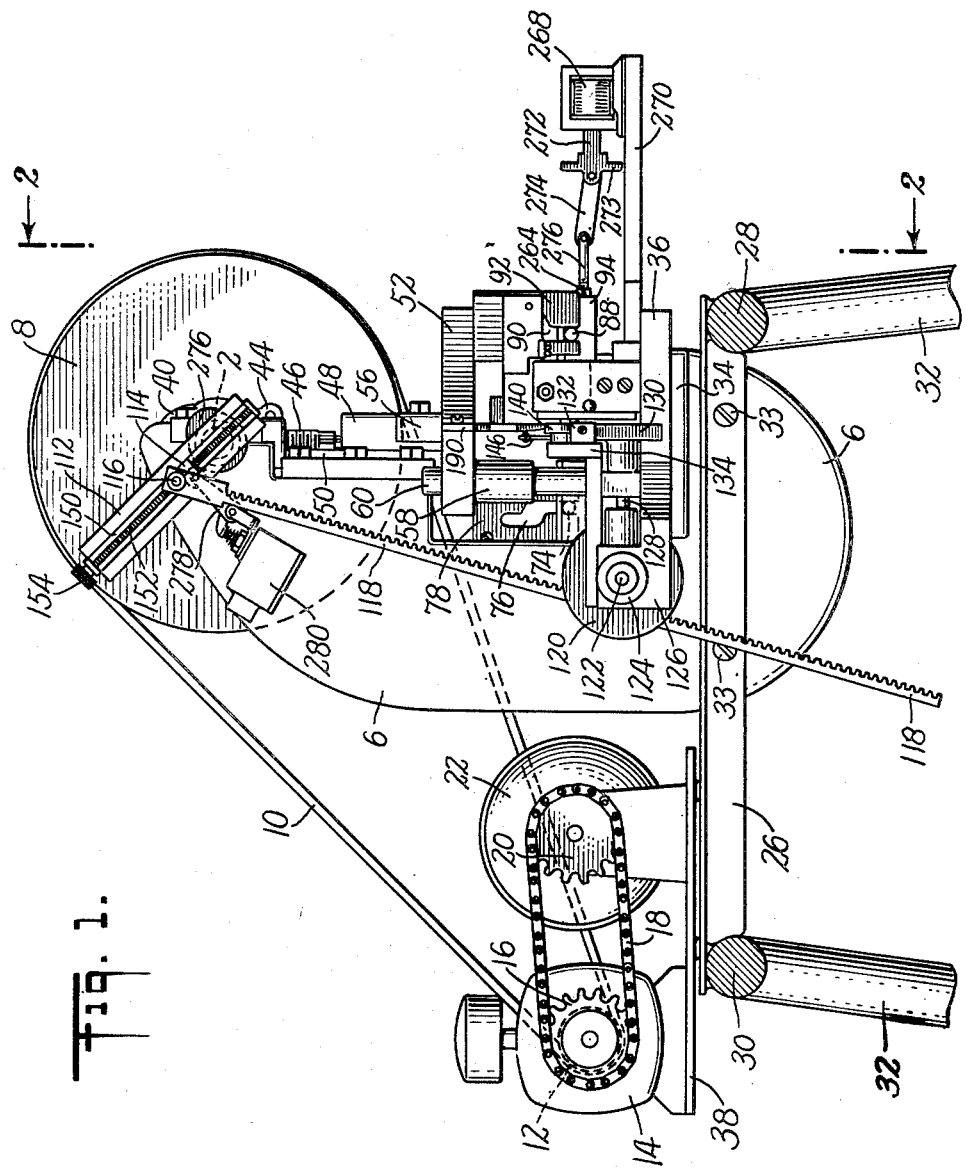
Figure 1 is a left hand side elevation of a machine embodying the novel mechanical features of the invention and particularly adapted for practicing the novel process of the invention.

In the illustrative embodiment of the invention (Figs. 1 and 2) the main shaft 2 of the machine has its bearings in spaced side frame members 4 and 6 which are connected by integral crossbars, not specifically shown. Rotation is imparted to the shaft through a V-pulley 8 mounted thereon and connected by a V-belt 10 to the output pulley 12 of a reduction gearing in a housing 14. The reduction gear is connected at its power input end to a sprocket wheel 16 driven by a sprocket chain 18 from a driving sprocket 20 on an electric motor 22. The side frame members 4 and 6 are supported upon angle bars 24 and 26 extending between the front and rear frame members 28 and 30 of a tubular frame having legs 32 to support the operative parts of the machine at a suitable height for convenient supervision and operation by the machine operator. One side of each angle bar is secured to the side of the associated side frame member by machine screws 33.

Each of the side frame members 4 and 6 is provided with a ledge portion 34 upon which is mounted a plate 36 serving as a supporting base for the strip feed mechanisms, the wire feed mechanism, the wire guides and the stationary parts of the wire cutting mechanism and the crimping mechanisms. Mounted upon this base is also a support for the solenoid through which one of the wire guides is opened to discharge the completed lead. A support 38 mounted upon the rear part of the tubular frame carries the electric motor 22 and the housing 14 for the speed reducing gear.

Keyed upon the main shaft 2 between the side members 4 and 6 is an eccentric 40 surrounded by an eccentric collar 42 having an internally threaded extension 44 into which is screwed a rod 46 having at its lower end the ball member (not shown) of a ball and socket joint, the socket of which is formed in the block 48 slotted at its side to travel on guides 50 on the side frame members 4 and 6 for vertical reciprocation as the eccentric 40 turns with the shaft 2. A reciprocating head or ram 52 has upon its upper side a rod or stem 54 (see Fig. 5) which is clamped in a socket, not shown, in the block 48 by means of a clamp plate 56 so that the head or ram 52 reciprocates with the block 48. To insure positive alignment of the parts during the reciprocation of the head or ram 52, the under side of this head or ram is preferably provided with guide sleeves 58 closely fitting and guided upon guide rods 60 fixed in the base plate 36, the head or ram 52 being provided with openings concentric with the sleeves 58 to permit the rod 60 to slide through and project above the head or ram 52.

As hereinabove suggested, the operative mechanism of the present invention comprises wire feeding means, spaced wire guides which are displaceable out of but are normally in wire guiding alignment, the wire feed mechanism being settable to feed at each operation a selected lead length of wire when said guides are in alignment, wire cutting means operating to cut the feed wire at a point substantially intermediate between the wire guides, two connector crimping mechanisms laterally offset from the line of feed of the wire and means, operable after the wire cutting operation, for effecting a relative displacement of the wire guides to bring the wire ends projecting therefrom into cooperative relation to said connector crimping mechanisms. As herein shown in Figs. 3 and 5, the wire guides, which are normally in wire guiding alignment, that is, are in such alignment when the reciprocating head or ram 52 is at the upper end of its reciprocating stroke and before it starts downwardly to effect the wire cutting and connector crimping operations, are located in two slides 62 and 64. The slide 62, which has in it the wire guide that first receives the wire from the wire feeding mechanism and has no provision for opening as does the other wire guide, is mounted to slide between side guides 66 and 68 and is confined in the guideway thus formed by a top plate 70. The side guide 66 is provided with a slot 72 through which projects a cylindrical stud or pin 74 adapted to travel in a cam groove 76 in a cam plate 78 connected to the reciprocating head or ram 52. It will be seen that this cam groove 76 in the cam plate 78 is so shaped that when the head 52 is in the upper half of its stroke the slide 62 will be held in the position shown in Fig. 3 in which its wire guide is in wire feeding alignment with the wire guide in the slide 64.

The slide 64, like the slide 62, travels in a guideway similar to that shown for the slide 62 and comprising side guides 80 and 82 and a top plate 84, the side 80 of the guideway thus formed having a slot 86 through which projects a smooth cylindrical pin or stud 88 travelling in a cam slot 90 in a cam plate 92 connected to the vertically reciprocable head or ram 52. The cam slot 90 in the plate 92, like the cam slot 76 in the plate 78, is so shaped that when the head 52 is in the upper half of its stroke it holds the slide 64 with its wire guide in wire feeding alignment with the wire guide in the slide 62.

Both of the guideways for the respective slides 62 and 64 have bottom plates as well as side and top portions and the bottom plates are mounted upon vertically movable, spring supported plungers for movement of the slides 62 and 64 transverse to their first sliding movements at the end of these first sliding movements which are brought about by the cam plates 78 and 92 connected to the head 52. Only one of these mountings is shown in detail in the drawings but the following description thereof applies to the plunger supports for the guideways for both of the slides 62 and 64.

Figure 5:
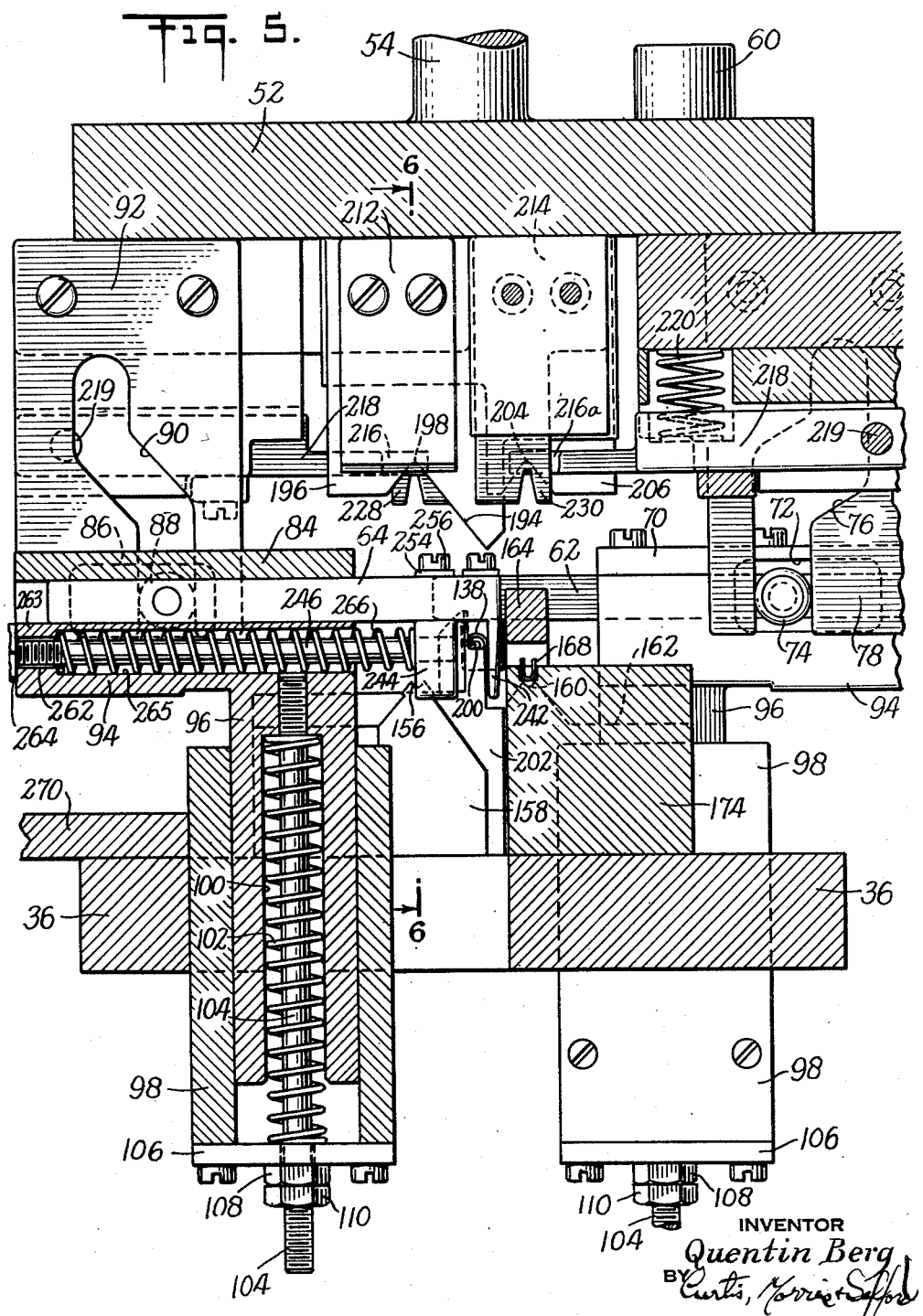
Figure 5 is a section on the line 5—5 of Fig. 3 and also on the line 5—5 of Fig. 4, looking in the direction indicated by the arrows in each case.

As shown particularly in Figure 5, which shows the guideway for the slide 64 in section, each of the guideways for the slides 62 and 64 is provided with a bottom 94 having connected thereto a square hollow stem or plunger 96 travelling in a correspondingly shaped vertical guide 98 extending through an opening in the plate 36 to both sides of said plate. As above pointed out, the square stem or plunger 96 is provided with a cylindrical socket 100 in which a spring 102 is seated. The upper or closed end of the socket 100 is tapped to receive the threaded end of a rod 104 which is also threaded at its lower end where it extends through the bottom plate 106 of the guide 98 to receive an adjusting nut 108 and a lock nut 110. It will be noted that the stem or plunger 96 is normally projected by the spring 102 above the upper end of the guide 98 to hold the guideway for the slide 62 or 64 at a predetermined distance above the plate 36 and also to hold the wire guide in the slide 62 or 64 at a predetermined distance above the stationary crimping member, into cooperative relation to which the slide 62 or 64 is moved after the wire cutting operation.

As hereinafter more fully described, after the slides 62 and 64 have been laterally offset to bring the wire ends projecting from their respective wire guides into position over the connector ferrules seated in the stationary parts of the crimping means, these slides are moved downwardly toward the plate 36 by pushers carried by the head 52 to cause the projecting wire ends to enter the open sides of the connector ferrules. The spring supported plungers 96, travelling in the vertical guides 98 and supporting the guideways for the slides 62 and 64, permit this transverse movement of each of the slides 62 and 64 at the end of their cam-effected horizontal movement in order to position the wire end projecting from the wire guides in the connector ferrules.

The wire feeding mechanism shown in the illustrative machine is substantially identical with that shown and described in my copending application Serial No. 203,305, filed December 29, 1950. Reference is made to said copending application for description and illustration of details of the wire feeding mechanism which are not herein specifically shown and described.

As in the wire feeding mechanism shown in said copending application, a crank arm 112 (see Fig. 1) fixed upon the driving shaft 2 carries in a guideway therein slide 114 having thereon a crank pin or pivot pin 116. A rack bar 118 is pivotally connected at one end to the pivot pin 116. This rack bar 118 engages a pinion (not shown) enclosed within a housing 120 and mounted on a shaft 122. The pinion engaged by the rack 118, as in the feeding mechanism in said copending application, is connected to an overrunning clutch (not shown) on the shaft 122 so that said shaft is not turned on the down stroke of the rack 118 but is turned by the action of the clutch when the rack starts on its return or up stroke. Another overrunning clutch 124, having one part attached to a bevel gear housing 126, serves to prevent the shaft 122 from turning in the non-feeding direction on the down stroke of the rack 118 while permitting it to turn in the wire feeding direction on the return stroke.

As in the wire feeding mechanism of said copending application, a bevel gear on the shaft 122 engages a bevel gear on a transverse shaft 128 that carries a feed wheel or roll 130, these bevel gears being not shown but being enclosed within the housing 126.

Figure 2:
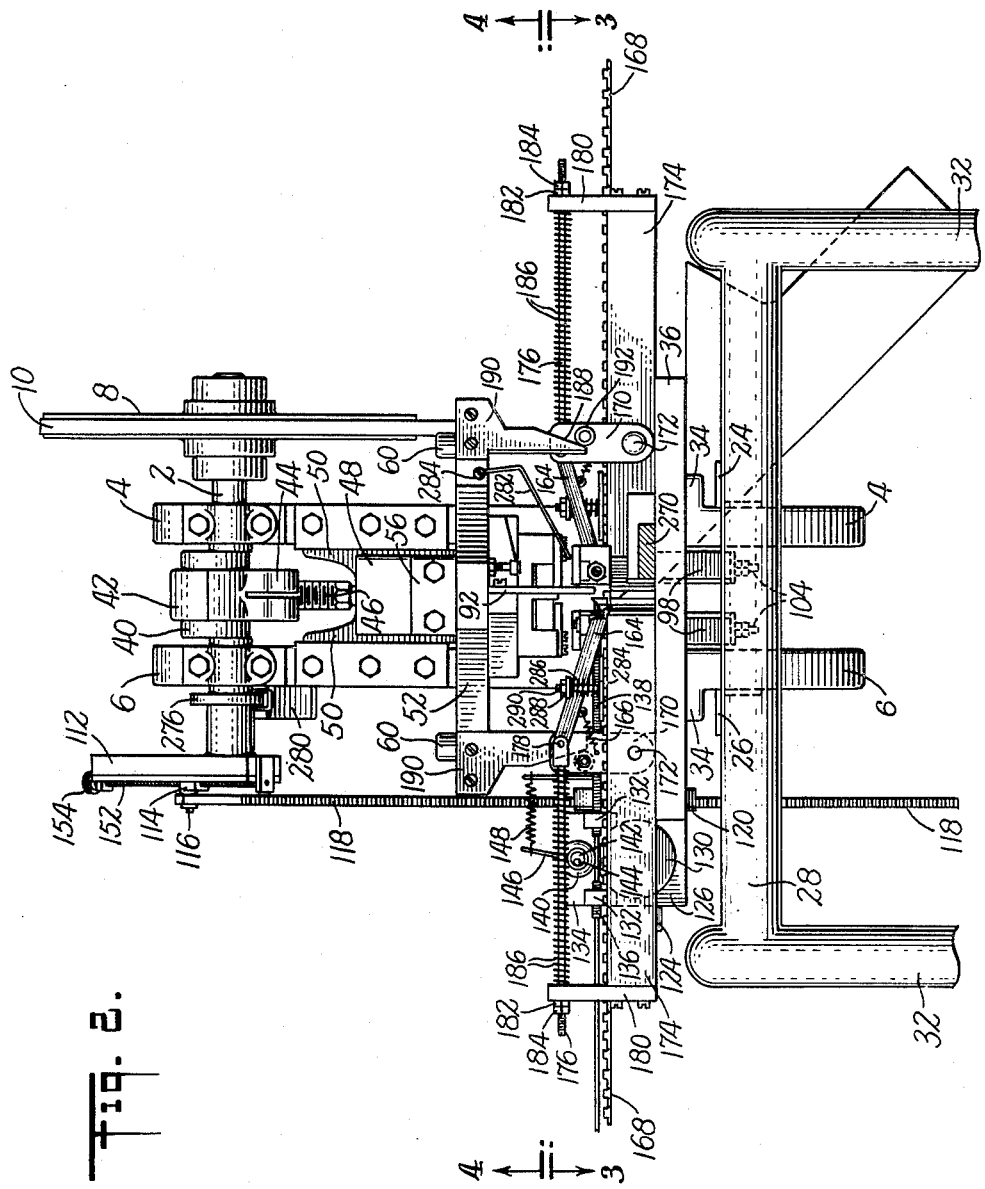
Figure 2 is a front elevation of the machine shown in Fig. 1, this view showing the guide-opening solenoid removed and its support sectioned.

As shown more fully in Fig. 2 of the drawings, the wire feeding roll or wheel 130 on the shaft 128, shown in Fig. 1, has its topmost segment extending between two bosses 132 on an upright plate 134, the left hand boss 132, shown in Fig. 2, supporting a flexible wire conduit 136 which guides the wire substantially to the bite of the feed rolls and right hand boss 132 supporting one end of a flexible wire conduit 138, the other end of which is connected to the slide 62, this conduit 138 serving to guide the feed wire from the bite of the feed rolls to the wire guide in the slide 62. The upper roll 140, which serves to press the wire into feeding engagement with the power driven roll 130, is preferably mounted upon a concentric ball bearing 142 which, in turn, is eccentrically supported upon a pivot 144 carried by the upright plate 134. An arm 146 connected to the eccentrically mounted bearing 142 and urged by a spring 148 in a clockwise direction about the pivot 144 in Fig. 2 tends to hold the roll 140 in tight pressing relation to the wire running over the lower roll 130.

Referring again to Figure 1, the pivot carrying slide 114, as above suggested, is adjustable in a slot 150 in the crank arm 112 and a lead screw 152 having its bearings in the ends of the crank arm 112 is arranged to be turned by a milled thumb wheel 154 to effect the adjustment of the slide 114 along the slot 150 and thus vary the length of the crank arm effecting the reciprocation of the rack 118, thereby varying the length of wire fed on each rotation of the shaft 2. As will hereinafter become apparent, this adjustment of the length of the crank arm which effects the reciprocation of the rack bar 118 is the only adjustment necessary to change the machine from a machine for making a lead of one length to a machine for making a lead of another length.

As may be seen from the positions of the parts in Figs. 1, 2 and 5 of the drawings, the operation of the wire feeding mechanism is so timed that the feeding begins as soon as the cam plates 78 and 92 have travelled far enough in their return movement with the head 52, after a crimping operation, to bring the studs or pins 74 and 88 respectively into the lower vertical parts of the cam grooves 76 and 90, which effects the movements of the slides 62 and 64 to bring the respective wire guides carried thereby into wire feeding alignment. The wire feed takes place in substantially one-half revolution of crank shaft 2. Feed is adjusted so that the upper half of stroke of head 52 is used for wire feeding.

Figure 3:
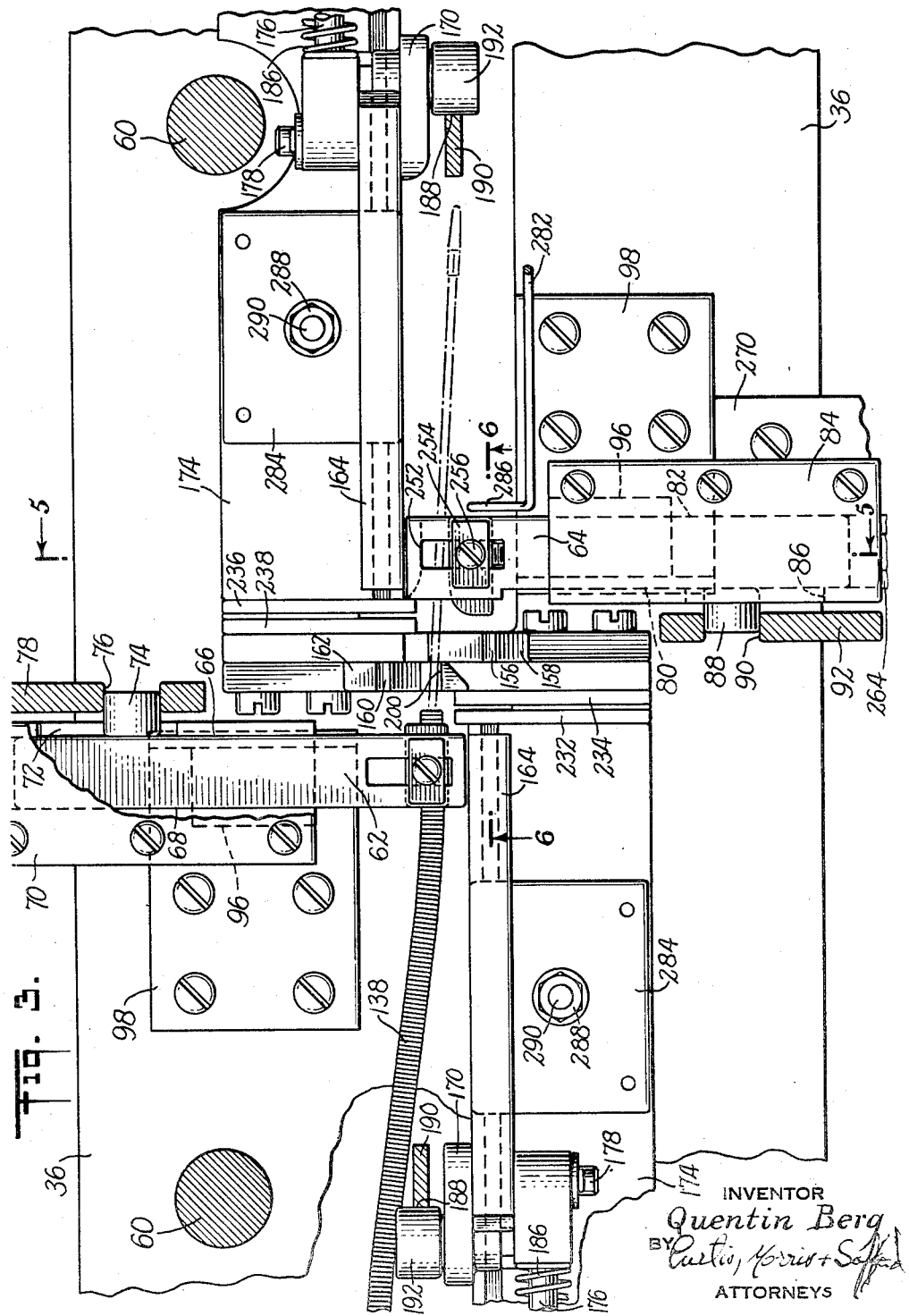
Figure 3 is a section on the line 3—3 of Fig. 2, looking in the direction indicated by the arrows, certain parts being broken away to permit showing the remaining parts on a larger scale.

As hereinabove pointed out and as is best seen in Figs. 3 and 5, the stationary parts or anvils 158 and 162 of the two connector crimping mechanisms are carried upon the plate 36 in laterally offset relation to each other and to the aline of feed of the wire. The anvil 156, upon which is crimped the ferrule of the connector that is to be attached to the trailing end of the lead wire, which projects from the guide in the slide 64 after the cutting operation, is shown as formed in the upper end of a plate 158 mounted upon the base plate 36, the upper edges of the plate 158 being tapered toward the hollow anvil which is shaped to receive the curved closed side of the ferrule preparatory to the crimping thereof. The anvil 160 for receiving the ferrule that is to be crimped upon the end of the wire which projects from the guide in the slide 62 after the cutting operation is formed in the upper end of a plate 162 mounted upon the base plate 36 and also having its upper edges tapered toward the hollowed out anvil that is to receive the rounded back of the ferrule to be crimped upon the new leading end resulting from the cutting operation.

The two connector strip feeding mechanisms which feed the respective end connectors into position on the anvils 156 and 160 just described are substantially identical in construction and essential mode of operation with the connector strip feeding mechanisms shown and described in my copending application Serial No. 203,305, filed December 29, 1950. In Figure 2, as in the case of the connector feed mechanisms shown in my copending application, each connector feed comprises a pawl 164 urged by a spring 166 into engagement with the connector strip 168, the pawl being pivoted upon a lever 170 fulcrumed at 172 on a block 174 which carries the guideway for the connector strip 168. A rod 176, having an enlarged head provided with an eye that is pivoted upon the same pivot 178 upon which the pawl 164 is pivoted, extends through a guide opening in an upright plate 180 connected to the outer end of the block 174 and is there provided with a stop nut 182 and a lock nut 184 screwed upon its threaded end to adjustably determine the limit of the feed movement of the pawl 164. A spring 186 confined between the upright plate 180 and the enlarged head of the rod 176 urges the pawl 164 to its forward limit of feeding movement determined by the stop nut 182.

The feeding of the connector strips is effected by spring action and the pick-up stroke of the pawl is effected by rocking the lever 170 about its fulcrum 172 against the action of the spring 186 in the direction to move the pawl 164 back over the connector strip 168 until the end of the pawl engages behind the ferrule end of the next connector on the strip. This movement of the pawl back over the connector strip to bring it into engagement with the ferrule end of the next connector is brought about in the illustrated machine by means of a cam 188 formed on a cam plate 190 connected to the head or ram 52, there being one of these cams for each connector feed mechanism. The cam 188 engages a cam roll 192 on the lever 170 and, as shown in Fig. 2, when the head 52 moves downward this cam 188 rocks the lever 170 about its fulcrum 172 in a direction to draw the feed pawl 164 back over the connector strip 168 into position to feed the next connector when the head 52 returns to its uppermost position, this feeding movement of the pawl taking place under the action of the spring 186, as hereinabove described.

The description just given applies to both connector strip feed mechanisms, which are identical and interchangeable. It will be noted that, as in the case of the wire feeding mechanism, the feeding of the connectors takes place on the return stroke of the head 52 after the crimping operations and is completed by the time the head 52 reaches the upper limit of its movement so that there is a connector ferrule resting on each of the anvils 156 and 160 before the wire cutting, wire guide offsetting and wire guide depressing operations begin, these operations all taking place prior to the actual crimping operations.

After the feeding of the wire, as hereinabove described, to provide the desired lead length of wire, the wire is cut substantially midway between the two spaced wire guides carried by the two slides 62 and 64 and this cutting necessarily takes place before the lateral displacement of the wire guides to bring the wire ends projecting therefrom over the respective connectors, preparatory to transverse displacement of the guides to introduce the wires into the connector ferrules. The cutting therefore takes place, as will be seen from a study of the cam slots 76 and 90 (Fig. 5), when the head 52 has descended approximately half of its total distance, that is, until the studs 74 and 88 have reached the inclined portions of the cam slots, respectively, when the lateral offsetting of the slides 62 and 64 begins.

Referring to Figs. 5–7, the cutting of the wire is effected by a shearing action, the upper shear blade, that is the one which moves with the head 52, being constituted by an extension 194 of the plate 196 that has formed in it the upper or female crimping die 198 which cooperates with the anvil or male crimping die 156. The lower or stationary shear is constituted by a rectangular notch 200 in a plate 202, which, if desired, may be formed integral with the plate 162 in the upper end of which the anvil 160 is formed. The rectangular notch 200 is substantially in line with the wire guides in the slides 62 and 64, when the guides are in wire feeding alignment, so that the wire practically rests on this shear plate prior to its engagement by the shear edge 194 of the plate 196. It will be noted that the notch 200 is open on the side toward the direction of displacement of the slide 62 so that the wire end, after the wire is cut, is free to move with the slide 62 into position over the anvil 160.

The female crimping die 204, which cooperates with the male crimping die or anvil 160, is formed in a plate 206, which, like the plate 196, is connected to the head 52. When the head 52 descends to move the female crimping dies 198 and 204 into crimping relation to the male crimping dies 156 and 160 in the operation of the machine, it will be seen that the first operation which takes place is the cutting of the wire by the shearing action of the shear plate 194 over the shear plate 202 and that then by reason of the studs 74 and 88 having entered the inclined parts of the cam slots 76 and 90 the slides 62 and 64 will be displaced laterally from their initial position of wire guiding alignment into such positions that the wire end carried by the slide 62 will be positioned over the connector ferrule resting upon the anvil 160 and that the projecting end of the wire carried by the slide 64 will be positioned over the ferrule resting on the anvil 156. As soon as the studs 74 and 88 enter the upper vertical parts of the slots 76 and 90, pushers 208 and 210, Figs. 4 and 6, projecting downwardly from the head 52, will engage the covers 70 and 84 of the guideways for the slides 62 and 64 respectively and depress these guideways against the resistance of the springs 102 a distance sufficient to cause the wire ends carried by the respective slides to be introduced into the open sides of the ferrules resting upon the anvils 160 and 156, respectively. This depression of the guideways for the slides 62 and 64 necessarily takes place before the female crimping dies 204 and 198 come into crimping relation to the connector ferrules on the anvils or make dies 160 and 156.

In order to insure proper location of the wire ends in the ferrules before the open sides of these ferrules are crimped upon the wire ends, so that the wire ends may not be pinched between the edges of the ferrule and thus improperly held, a plate 212 located upon the face of the plate 196 (Fig. 6) away from the connector pin projects over the female crimping die 198 sufficiently to engage the wire beyond the ferrule and press it down into the ferrule before the crimping die 198 crimps the edges of the ferrule together. A similar plate 214 on the exposed wire side of the plate 206, in which the female crimping die 204 is formed, performs a like operation on the wire end projecting from the slide 62 before the connector ferrule is crimped thereon.

In order that the ferrules may not roll or turn about on the anvils 156 and 160 before or during the crimping operation, means are preferably associated with each of the female crimping dies which engage the connectors in the recesses 215 (Fig. 6) between the ferrules and the pin ends thereof and act to maintain the ferrule sides in their upright position. As herein shown in Figs. 4–6, these means comprise levers having bevelled ends 216 and 216a shaped to enter the recess 215 between the ferrule and the pin part of the connector resting on the associated anvil, this bevelled end 216 being located on the end of the arm 218 (Fig. 4 and Fig. 5) of the lever and normally projecting over the female crimping die to such an extent that the bevelled end 216 enters the recess 215 before the crimping die engages the ferrule sides. The levers 218 fulcrumed at 219, are preferably spring urged downward into their positions over the openings in the female dies by springs 220. As will be seen, the bevelled ends 216 and 216a of the levers 218 are located on the side of the female crimping die opposite to that on which the wire depressing plate 212 or 214 is located.

The connector strips employed with the machine of the present invention are substantially identical with those shown and described in my copending application above identified, the pin end 222 (see Fig. 6) of each connector being connected by a short neck 224 to the ferrule end 226 of the next connector and the connector strips being fed ferrule first into position over the crimping anvils. The means for severing the end connector from the strip at the time of the crimping operation operates on a slugging principle similar to the severing means shown and described in my above identified copending application. As shown particularly in Figs. 5 and 6, the upper slugging plates 228 and 230 that cooperate with the connector strips fed over the anvils 156 and 160 are forked and cooperate with pairs of shear plates 232 and 234 and 236 and 238, these pairs of shear plates showing an increased spacing from their cutting edges down to facilitate the discharge of the strip sections sheared out as the slugging plates 228 and 230 come into cooperative relation thereto.

From the foregoing description it will be seen that, as the shaft 2 turns and the head 52 reciprocates, the following operations will take place, assuming that a connector has just been crimped upon the end of each of the wires projecting from the wire guides in the slides 62 and 64. As the head 52 starts upward the upper straight portions of the cam slots 76 and 90 will maintain the slides 62 and 64 in their laterally displaced positions until the head has moved far enough upward to permit the springs 102 to raise the guideways for the slides 62 and 64 to their normal positions above the base plate 36. Further movement of the head 52 will cause the inclined portions of the cam slots 76 and 90 to move the slides 62 and 64 back into the positions in which their wire guides are in alignment with each other. As soon as the wire guides are in alignment with each other the crank arm 112 on the shaft 2 will start the wire feeding. However, before the wire can be fed it is necessary that the lead which has been completed and is held in the wire guide in the slide 64 be removed from the guide to permit a new length of wire to be fed through the guide. An important feature of the invention is the provision for discharge of the completed lead.

As shown in Figs. 3, 5, 6, 7, 8 and 9, the slide 64 has its wire guide formed of two relatively movable jaws, one of which is a fixed jaw 242 depending from the body of the slide proper and the other a movable jaw 244 carried upon the end of a rod 246 threaded at one end into said jaw 244. The jaw 244 is in the form of a sliding block having a stud 250 (Fig. 6) projecting through a slot 252 in the slide 64 and held against dropping out of said slot by a cross plate 254 secured in position on the stud 250 by a screw 256. It will be seen that the jaw 244 has a rounded edge 258 to facilitate the entry of the wire between the jaws during the wire feeding operation, the fixed jaw 242 also having a rounded edge 260 for the same purpose.

At its rear end the rod 246 extends through an opening 262 in a wall 263 which constitutes the bottom of a spring socket 265 in the base 94 of the slide guide for the slide 64. The end of the rod on the outside of the socket bottom 263 is threaded and is provided with a stop nut 264 (Fig. 5) to determine the setting of the movable jaw 244 in respect to the fixed jaw 242, the movable jaw 244 being normally urged toward the fixed jaw 242 by a spring 266 surrounding the rod 246 and confined in the socket 265 between the bottom 263 of the socket and the jaw block 244.

The adjustment of the jaw 244 in respect to the jaw 242, when the slide 64 is in its wire feeding position, is preferably such that the wire may be readily fed between the jaws, the jaws at this time being preferably slightly more than the wire thickness apart. Since the socket bottom 263 is fixed in respect to the slide 64 it will be seen that, when the slide 64 is moved, after the cutting operation, to bring the projecting end of the lead wire therein over the connector ferrule resting upon the anvil 156, as soon as this movement of the slide begins the jaw 242 will press the wire against the jaw 244 and as the slide 64 continues to move the jaw 244 and rod 246 will be moved against the pressure of the spring 266 thus causing the wire to be clamped tightly between the jaws for the subsequent operations thereon. This movement of the slide 64 begins before the wire is cut so that the wire will be clamped for the cutting operation.

To permit the jaws to be opened sufficiently to release the completed lead, solenoid means are provided for holding the jaw 244 stationary when the slide 64 starts its return movement after the completion of the crimping operations. In the illustrative embodiment of the invention, Fig. 1, the solenoid 268 is mounted upon a supporting plate 270 mounted upon and projecting from the front of the base plate 36 and the core 272 of the solenoid is connected by a link 274 to an extension 276 of the rod 246. The link connection permits the free movement of the slide 64 up and down and the solenoid core 272, being freely movable in the solenoid 268 when the solenoid is not energized, travels with the rod 246 in its horizontal movements.

Figure 4:
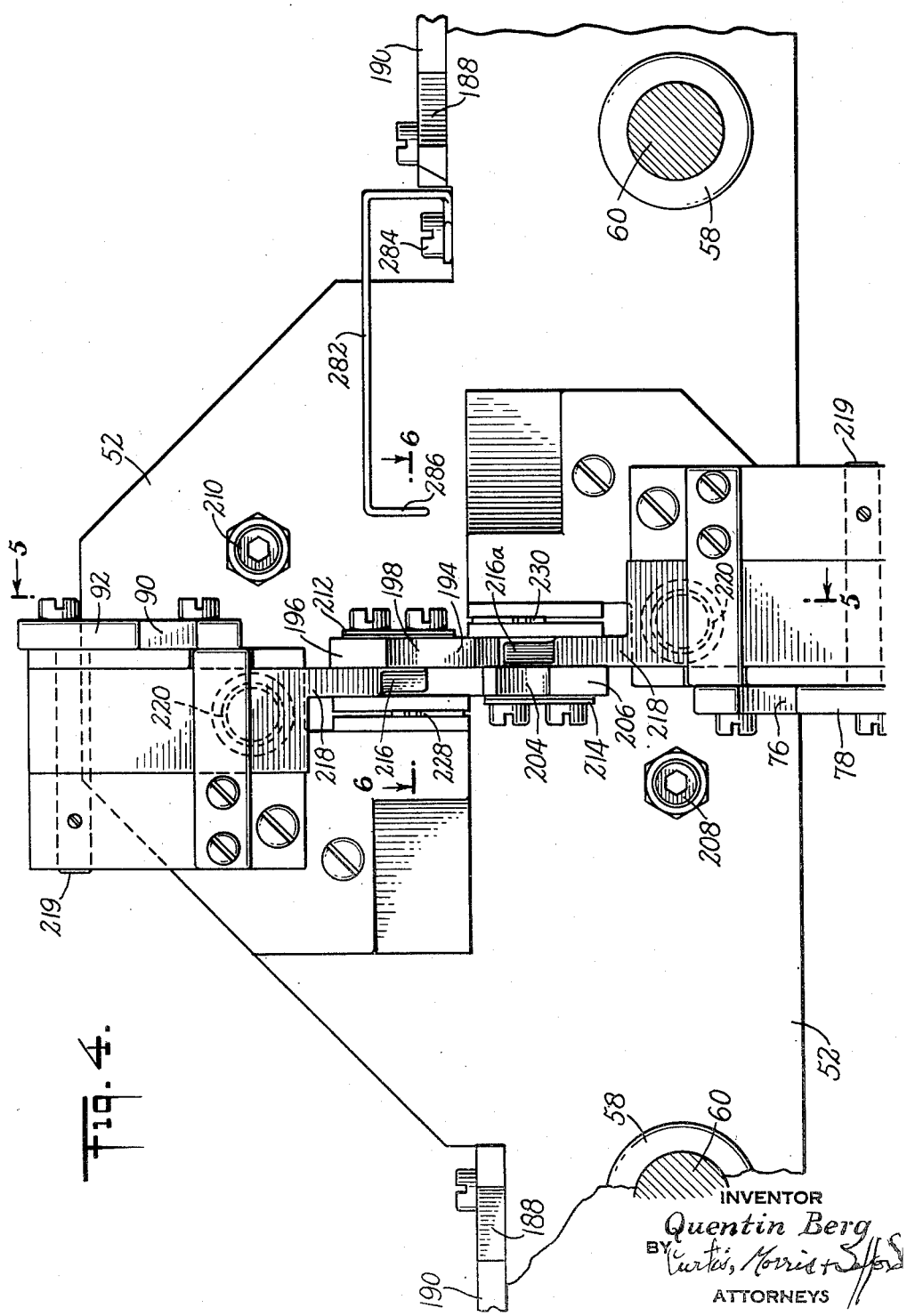
Figure 4 is an inverted plan view of the reciprocating head or ram and the parts carried thereby, taken on line 4—4 of Fig. 2.

Carried upon the shaft 2 (Fig. 1) is a lobe cam 276 which operates the actuating arm 278 of a microswitch enclosed within a switch housing 280. When the lobe portion of the cam 276 engages the arm 278 of the micro-switch 280 it closes a circuit that energizes the solenoid 268 and causes it to hold its core 272, which at that time is in its withdrawn position, temporarily against movement with the slide 64 and thus holds back the rod 246 against the spring 266. This permits the jaw 242 to move with the slide 64 away from the jaw 244 thus releasing the lead that has been held between the jaws and permitting it to drop into a chute and thus be discharged. To assist this discharge of the lead from the opened jaws, a spring wire 282 is carried by the head 52, being clamped thereto by a screw 284 as shown in Fig. 4. This spring wire, which may be a bent-up piece of piano wire, normally projects below the head 52 when in its uppermost position. As the head descends a part 286 of this wire, shown as bent at substantially right angles to the main part, engages that part of the lead wire which is located on the opposite side of the slide 64 from the end that is to receive the connector, the further descent of the head putting an increased spring pressure upon the lead which, though comparatively slight, is sufficient to assist in ejecting the lead from the wire guide in the slide 64 as soon as the jaws are open. This occurs on the upward movement of the head 52, as the return movement of the wire guides into their position of wire guiding alignment starts.

From an inspection of Figure 1 of the drawings, which shows the angular relation of the eccentric 40, the lobe cam 276 and the crank arm 112 on the shaft 2, the shaft in Figure 1 turning in a clockwise direction, it will be seen that the high point on the switch closing lobe cam 276 is angularly spaced about the axis of the shaft 2 in respect to the crank arm 112 more than 90°, so that the energization of the solenoid 268 is ended before the rack bar 118 starts its feed roll actuating upstroke. The de-energization of the solenoid 268 thus permits the jaw 244 to move back into cooperative relation to the jaw 242 under the action of the spring 266 just as the wire feeding begins. This insures guiding of the wire between the jaws 242 and 244 into position to be gripped for the cutting and crimping operations that follow the wire feeding, as hereinabove pointed out.

It will further be seen that (Fig. 2), as soon as the upward movement of the head 52 has proceeded far enough to bring the cam portion 188 of the cam plate 190 into engagement with the cam roll 192 on the lever 170, the lever 170 will start to rock about its fulcrum 172 in the connector strip feeding direction under the action of the spring 176 and further upward movement of the head 52 will permit the completion of the connector feed. In this connection it may be pointed out that each connector strip is held in its guideway and against backward movement when the pawl 164 is drawn back to a new feeding position by means of a drag plate 284 (Fig. 2) which is pressed down upon the connector strip by a spring 286 confined between the drag plate 284 and a nut 288 on the threaded upper end of a post 290 which the spring surrounds, as shown in Fig. 2.

The head 52 having reached the upper limit of its movement, the feeding of the wire will be approximately half completed. Completion of the wire feed is accomplished when head 52 reaches its mid-position of the down stroke. The feeding of a connector into position over each crimping anvil will have been completed at the top of stroke of head 52. When the head 52 again moves downward the straight lower portions of the cam slots 76 and 90 in the cam plates 78 and 92 (Fig. 5) will hold the wire guides in the slides 62 and 64 in their position of wire feeding alignment until the shear edge 194 on the plate 196 is about to engage the wire resting upon the ledge 200 of the plate 202 to shear the wire at a point substantially intermediate between the guides in the slides 62 and 64. At this time the head 52 will have reached a position in its downward descent in which the studs 74 and 88 are about to enter the inclined portions of the slots 76 and 90 and the lateral displacement of the slides 62 and 64 together with the wire guides therein is about to begin.

Referring to Fig. 5, it will be noted that the cam slot 76 which controls the movement of the slide 62 is widened at its inclined portion so that the lateral displacement of the slide 62 does not begin until after the lateral displacement of the slide 64 has begun. As hereinabove pointed out, the lateral displacement of the slide 64 begins just before the wire is cut in order to cause the jaw 242 to press the wire against the jaw 244 and clamp it, both to hold it for the cutting operation and to prevent the lead from dropping out of the slide 64 after the wire is cut. It is of course important that the wire rest on the ledge 200 until the cutting is completed and therefore the movement of the slide 62 does not begin until after the cutting has been completed. The completion of the movements of the two slides into their laterally displaced positions will, however, as will be noted from a study of Fig. 5, take place substantially simultaneously.

It will be noted that the widening of the inclined portion of the cam slot 76 serves, on the upstroke of the head 52, to permit the cutting edge portion 194 of the plate 196 to clear the path of the return stroke of the guide 62 with the lead end of the wire and its attached terminal. In other words, on the upstroke of head 52 the lead end of the wire in the guide 62, with its attached terminal, is moved back to feed alignment only after the cut-off knife 194 has cleared the terminal. Since the wire, before attachment of the terminal, moves beyond the cutting edge portion 194 of the plate 196, no interference occurs on the down stroke.

The shape of slot 90 in cam plate 92 is determined by angle of cutting portion 194 of plate 196 and must be flat enough so that cut-off lead will move transversely fast enough to avoid rubbing on cutting edge 194.

From a further study of Fig. 5 it will be seen that the studs 74 and 88 will enter the upper straight portions of the slots 76 and 90 at the completion of the lateral displacement of the slides 62 and 64 and that they will travel in these upper vertical portions of the slots during the depression of the guides to bring the wire ends projecting therefrom into the open-sided ferrules of the connectors resting upon the anvils and the crimping of the ferrules upon the wire ends, as hereinabove more specifically set forth. This completes the cycle of operations. A new cycle begins immediately.

As hereinabove suggested, when it is desired to use the machine for making leads of different lengths, all that is required to produce the particular length of lead desired is to adjust the wire feeding mechanism. This is done simply by turning the thumb wheel 154 to turn the lead screw 152 to move the slide 114 carrying the pivot 116 either toward or away from the axis of rotation of the crank arm 112. Such adjustment will either decrease or increase the length of stroke of the rack 118 and thus vary the length of wire fed at each rotation of the shaft 2. It will be obvious that no other adjustment in the machine is required since the wire ends upon which the connectors are to be crimped will necessarily be in the same position as before.

What is claimed as new is:

1. The process of making electrical leads, each comprising a suitable length of lead wire having a connector attached thereto at each end in electrically conductive relation thereto, which consists in crimping a connector upon the leading end of conductor wire drawn from a coil or other source of continuous supply, feeding the wire and attached connector past the point at which the connector was crimped thereon until the fed portion provides a lead of the desired length, severing said length, holding each wire near the end formed by the severing operation and crimping connectors respectively upon the trailing end of the severed lead wire and upon the new leading end of the wire from said coil or other source of continuous supply and then repeating the feeding, cutting and crimping cycle of operations.

2. A process according to claim 1 in which the wire ends produced by the severing step are separated before the connectors are crimped thereon.

3. A process according to claim 1 in which the wire ends produced by the severing step are laterally displaced in respect to each other before the connectors are crimped thereon.

4. The process of making electrical leads comprising a suitable length of wire having a connector attached thereto at each end in electrically conductive relation therewith, which is characterized by feeding a pair of oppositely-directed connectors to a pair of positions adjacent a path of wire feed and feeding a suitable length of conductive wire drawn from a longer supply thereof along said path past a point between said pair of positions, severing said length at said point while holding said wire on each side of said point, crimping one of said pair of connectors onto each of the thus severed wire ends, releasing the severed length, feeding to the suitable length the wire with said connector on its end, and repeating the connector feeding, wire severing, and crimping operations.

References Cited in the file of this patent

UNITED STATES PATENTS

| Number | Name | Date |
| --- | --- | --- |
| 1,836,500 | Poole | Dec. 15, 1931 |
| 1,836,503 | Poole | Dec. 15, 1931 |
| 1,900,695 | Curtis | Mar. 7, 1933 |
| 2,592,276 | Hackbarth | Apr. 8, 1952 |
| 2,613,427 | Adams et al. | Oct. 14, 1952 |
| 2,673,345 | Berg | Mar. 30, 1954 |